US009916292B2

(12) United States Patent
Karpov

(10) Patent No.: US 9,916,292 B2
(45) Date of Patent: Mar. 13, 2018

(54) METHOD OF IDENTIFYING A TARGET OBJECT ON A WEB PAGE

(71) Applicant: YANDEX EUROPE AG, Lucerne (CH)

(72) Inventor: Victor Vladimirovich Karpov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/511,087

(22) PCT Filed: Nov. 3, 2015

(86) PCT No.: PCT/IB2015/058500
§ 371 (c)(1),
(2) Date: Mar. 14, 2017

(87) PCT Pub. No.: WO2017/001901
PCT Pub. Date: Jan. 5, 2017

(65) Prior Publication Data
US 2017/0242830 A1 Aug. 24, 2017

(30) Foreign Application Priority Data

Jun. 30, 2015 (RU) .............................. 2015125825

(51) Int. Cl.
G06F 17/00 (2006.01)
G06F 17/22 (2006.01)
G06N 7/00 (2006.01)

(52) U.S. Cl.
CPC ......... *G06F 17/2247* (2013.01); *G06N 7/005* (2013.01)

(58) Field of Classification Search
None
See application file for complete search history.

(56) References Cited

U.S. PATENT DOCUMENTS 6,029,195 A 2/2000 Herz
6,044,375 A 3/2000 Shmueli et al.
(Continued)

FOREIGN PATENT DOCUMENTS

CN 104021158 A 9/2014
RU 2377645 C2 12/2009
WO 2014149748 A1 5/2014

OTHER PUBLICATIONS

International Search Report from PCT/IB2015/058500, dated Feb. 23, 2016, Shane Thomas.
(Continued)

*Primary Examiner* — Howard Cortes
(74) *Attorney, Agent, or Firm* — BCF LLP

(57) ABSTRACT

The methods and systems described herein relate to identifying a target object on a web page by receiving rendering instructions associated with the web page, parsing the rendering instructions to identify a target object candidate amongst the web page elements; rendering the web page based on the rendering instructions, executing a verification process to confirm that the target object candidate is the target object, applying a set of predetermined rules to the rendered version of the target object candidate and assigning a likelihood parameter indicative of a probability of the target object candidate being the target object. Other embodiments of the verification process are also disclosed herein.

13 Claims, 5 Drawing Sheets

(56) References Cited

U.S. PATENT DOCUMENTS

| | | | |
|---|---|---|---|
| 6,516,308 B1 | 2/2003 | Cohen | |
| 8,107,739 B2 | 1/2012 | Seeber | |
| 9,159,081 B2* | 10/2015 | Kobyakov | G06Q 30/0241 |
| 9,563,325 B2* | 2/2017 | Chakra | G06F 3/0481 |
| 2006/0259462 A1 | 11/2006 | Timmons | |
| 2008/0148144 A1* | 6/2008 | Tatsumi | G06F 17/218 |
| | | | 715/235 |
| 2009/0070413 A1* | 3/2009 | Priyadarshan | G06F 17/2247 |
| | | | 709/203 |
| 2012/0102461 A1 | 4/2012 | Schwartz et al. | |
| 2012/0239598 A1* | 9/2012 | Cascaval | G06F 17/30899 |
| | | | 706/12 |
| 2013/0031455 A1 | 1/2013 | Griffiths et al. | |
| 2013/0124968 A1 | 5/2013 | Dontcheva et al. | |
| 2013/0223692 A1 | 8/2013 | Liu et al. | |
| 2013/0268843 A1 | 10/2013 | Xu et al. | |
| 2015/0153927 A1 | 6/2015 | Kashibuchi | |

OTHER PUBLICATIONS

English abstract for CN104021158 retrieved from Espacenet on Mar. 1, 2016.

\* cited by examiner ved herein.

METHOD OF IDENTIFYING A TARGET OBJECT ON A WEB PAGE

CROSS-REFERENCE

The present application claims priority to Russian Patent Application No 2015125825, filed Jun. 30, 2015, entitled "METHOD OF IDENTIFYING A TARGET OBJECT ON A WEB PAGE" the entirety of which is incorporated herein.

FIELD

The present technology relates to methods of and systems for identifying a target object based on a rendered version of a web page by a browser.

BACKGROUND

In recent years, the use of internet content such as, for example, internet web pages, web advertisement, electronic forms and others, has become widely popular for data processing. Some web pages may include various web pages elements, some being static and others being interactive. These web page elements may correspond to different types and may be associated with a plethora of visual characteristics due to their variety and contrasting nature.

Typically, a web page is defined by a document containing HyperText Markup Language (HTML) code. An HTML document suitable for posting on the internet includes both "content" and "markup." The content is information which describes a web page's text or other information for display or playback on a computer's monitor, speakers, etc. The markup is information which describes the web page's display characteristics, such as how the content is displayed and how other information can be accessed via the web page.

In order to provide web-based information and services over the internet, the web employs client computers, browser software and servers. A client computer is a computer used by an individual to connect to the internet and access web pages. A browser is a software application, located on a client computer, which requests, via the internet, a web page from a server. After receiving the web page, the browser displays the web page elements on the client computer's display. A server is a computer which stores or hosts web page information, retrieves that information in response to a browser's request, and sends the information, via the internet, to the client computer.

More specifically, the browser software may encompass a rendering engine for rendering the content information with corresponding markup on the display of the client computer. The rendering engine is responsible for displaying the content that the user sees. It communicates with the networking layer of the browser to retrieve the HTML code and other items passed from the server. The rendering is generally done by following the steps of: parsing the HTML, constructing the render tree, layout processing and painting.

The HTML code is a hierarchal structure that begins with an <html> tag, usually contains a <head> and <body> tag, and further includes web page content that corresponds to various web page elements. These web page elements are parsed and turned into a Document Object Model (DOM) tree by the rendering engine. The DOM tree is a structure where each tag is a branch thereof. Style attributes are also passed from the hosting server before being parsed and combined with the DOM tree to create a render tree. The render tree is a structure of visual characteristics such as height/width, style, and ordered in the hierarchy in which they are to be displayed in the browser.

Once the render tree is constructed, the rendering engine recursively goes through the web page elements in the DOM tree and figures out where they should be placed on the display. In other words, the web page elements and their features are mapped to coordinates on the screen based on their respective positions. Each branch of the render tree is drawn out on the display by communicating with the Operating System Interface of the client computer.

Web page elements may correspond to different known visual entities on the web page. For instance, web page elements may correspond to web advertisement, to videos, to interactive objects, to electronic filling forms, etc.

SUMMARY

It is an object of the present technology to ameliorate at least some of the inconveniences present in the prior art.

Developers of the present technology have realized that being able to identify particular web page elements may be beneficial for internet users and businesses since such information may increase browsing conviviality.

According to one aspect of the present technology, there is provided a method of identifying a target object on a web page, the web page being associated with rendering instructions for rendering web page elements of the web page, the method is executed by a browser at the electronic device. The method comprises receiving the rendering instructions associated with the web page, parsing the rendering instructions to identify a target object candidate amongst the web page elements, rendering the web page based on the rendering instructions, executing a verification process to confirm that the target object candidate is the target object, the verification process being executed on a rendered version of the web page, the rendered version of the web page including a rendered version of the target object candidate. The verification process comprises applying a set of predetermined rules to the rendered version of the target object candidate, the set of predetermined rules having been predetermined based on rendered object characteristics of the target object. The applying comprises determining at least one rendered object characteristic value associated with the rendered version of the target object candidate and validating each rule within the set of predetermined rules with the at least one rendered object characteristic value. The verification process also comprises assigning a likelihood parameter indicative of a probability of the target object candidate being the target object, the likelihood parameter being based on an outcome of the validating each rule within the set of predetermined rules with the at least one rendered object characteristic value.

In some implementations of the method, the rendering instructions are a portion of a web page data.

In some implementations of the method, parsing the rendering instructions comprises identifying a type of the target object candidate, the type being one of potential types of the target object. The verification process is further executed on the rendering instructions. The verification process further comprises applying at least one other predetermined rule within the set of predetermined rules to the target object candidate, the at least one other predetermined rule having been predetermined based on code features being related to the potential types of the target object, the code features being related to the potential types of the target object having been assessed by a human assessor. The applying comprises validating the at least one other predetermined rule with a code feature value of the target object candidate, the code feature value being determined from the rendering instructions. The likelihood parameter can be further based on the outcome of the validating the at least one other predetermined rule with the code feature value.

In some implementations of the method, the method further comprises, responsive to the likelihood parameter being above a predetermined threshold, determining that the target object candidate corresponds to the target object.

In some implementations of the method, the target object is at least one of a logo entity, a map entity, a banner entity, an advertisement entity and an input form entity.

In some implementations of the method, the target object candidate is one of a plurality of target object candidates identified during execution of the parsing.

In some implementations of the method, a first target object candidate of the plurality of target object candidates is of a first type and a second target object candidate of the plurality of target object candidates is of a second type.

In some implementations of the method, the set of predetermined rules comprises sub-sets of predetermined rules, each sub-set of predetermined rules having been predetermined based on the rendered object characteristics of the target object and based on the code features that are related, respectively, to each potential type, the potential types including the first type and the second type.

In some implementations of the method, the likelihood parameters of the first target object candidate and of the second target object candidate have been assigned based on the outcome of the validating each rule within a first and a second sub-sets of predetermined rules respectively, the first sub-set of predetermined rules having been predetermined based on the rendered object characteristics of the target object and the code features being related to the first type and the second sub-set of predetermined rules having been predetermined based on the rendered object characteristics of the target object and the code features being related to the second type.

In some implementations of the method, executing the verification process is performed by means of a machine learned algorithm.

In some implementations of the method, at least one rule within the set of predetermined rules is a soft rule.

In some implementations of the method, validating at least one additional rule within the set of predetermined rules has a detrimental effect on the likelihood probability In some implementations of the method, responsive to the likelihood parameters of more than one target object candidates being above the predetermined threshold, determining that the more than one target object candidates correspond to the target object.

In some implementations of the method, the method further comprises collecting data associated with every target object candidate corresponding to the target object. The data comprises the rendering instructions for every target object candidate corresponding to the target object.

According to one aspect of the present technology, there is provided a computing apparatus having a processor, the processor executing a browser, the browser is executed for identifying a target object on a web page, the web page being associated with rendering instructions for rendering web page elements of the web page. The browser is configured to receive the rendering instructions associated with the web page, parse the rendering instructions to identify a target object candidate amongst the web page elements, render the web page based on the rendering instructions, execute a verification process to confirm that the target object candidate is the target object, the verification process being executed on a rendered version of the web page, the rendered version of the web page including a rendered version of the target object candidate. The verification process comprises applying a set of predetermined rules to the rendered version of the target object candidate, the set of predetermined rules having been predetermined based on rendered object characteristics of the target object. The applying comprises determining at least one rendered object characteristic value associated with the rendered version of the target object candidate and validating each rule within the set of predetermined rules with the at least one rendered object characteristic value. The verification process also comprises assigning a likelihood parameter indicative of a probability of the target object candidate being the target object, the likelihood parameter being based on an outcome of the validating each rule within the set of predetermined rules with the at least one rendered object characteristic value.

In some implementations of the computing apparatus, the rendering instructions are a portion of a web page data.

In some implementations of the computing apparatus, to parse the rendering instructions comprises identifying a type of the target object candidate, the type being one of potential types of the target object. The verification process is further executed on the rendering instructions. The verification process further comprises applying at least one other predetermined rule within the set of predetermined rules to the target object candidate, the at least one other predetermined rule having been predetermined based on code features related to the potential types of the target object, the code features related to the potential types of the target object having been assessed by a human assessor. The applying comprises validating the at least one other predetermined rule with a code feature value of the target object candidate, the code feature value being determined from the rendering instructions. The verification process also comprises the likelihood parameter being further based on the outcome of the validating the at least one other predetermined rule with the code feature value.

In some implementations of the computing apparatus, the browser is further configured, responsive to the likelihood parameter being above a predetermined threshold, to determine that the target object candidate corresponds to the target object.

In some implementations of the computing apparatus, the target object is at least one of a logo entity, a map entity, a banner entity, an advertisement entity and an input form entity.

In some implementations of the computing apparatus, the target object candidate is one of a plurality of target object candidates identified during execution of the parsing.

In some implementations of the computing apparatus, a first target object candidate of the plurality of target object candidates is of a first type and a second target object candidate of the plurality of target object candidates is of a second type.

In some implementations of the computing apparatus, the set of predetermined rules comprises sub-sets of predetermined rules, each sub-set of predetermined rules having been predetermined based on the rendered object characteristics of the target object and based on the code features that are related, respectively, to each potential type, the potential types including the first type and the second type.

In some implementations of the computing apparatus, likelihood parameters of the first target object candidate and of the second target object candidate have been assigned based on the outcome of the validating each rule within a first and a second sub-sets of predetermined rules respectively, the first sub-set of predetermined rules having been predetermined based on the rendered object characteristics of the target object and the code features being related to the first type and the second sub-set of predetermined rules having been predetermined based on the rendered object characteristics of the target object and the code features being related to the second type.

In some implementations of the computing apparatus, executing the verification process is performed by means of a machine learned algorithm In some implementations of the computing apparatus, at least one rule within the set of predetermined rules is a soft rule.

In some implementations of the computing apparatus, validating at least one additional rule within the set of predetermined rules has a detrimental effect on the likelihood probability.

In some implementations of the computing apparatus, responsive to the likelihood parameters of more than one target object candidates being above the predetermined threshold, the browser is configured to determine that the more than one target object candidates correspond to the target object.

In some implementations of the computing apparatus, the browser is further configured to collect data associated with every target object candidate corresponding to the target object. The data comprises the rendering instructions for every target object candidate corresponding to the target object.

In the context of the present specification, unless expressly provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless expressly provided otherwise, "client device" is any computer hardware that is capable of running software appropriate to the relevant task at hand. Thus, some (non-limiting) examples of client devices include personal computers (desktops, laptops, netbooks, etc.), smartphones, and tablets. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless expressly provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the expression "component" is meant to include software (appropriate to a particular hardware context) that is both necessary and sufficient to achieve the specific function(s) being referenced.

In the context of the present specification, unless expressly provided otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, the expression "interactive" is meant to indicate that something is responsive to a user's input or that at least portions thereof are responsive to a user's input.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication. Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DESCRIPTION

Figure 1:
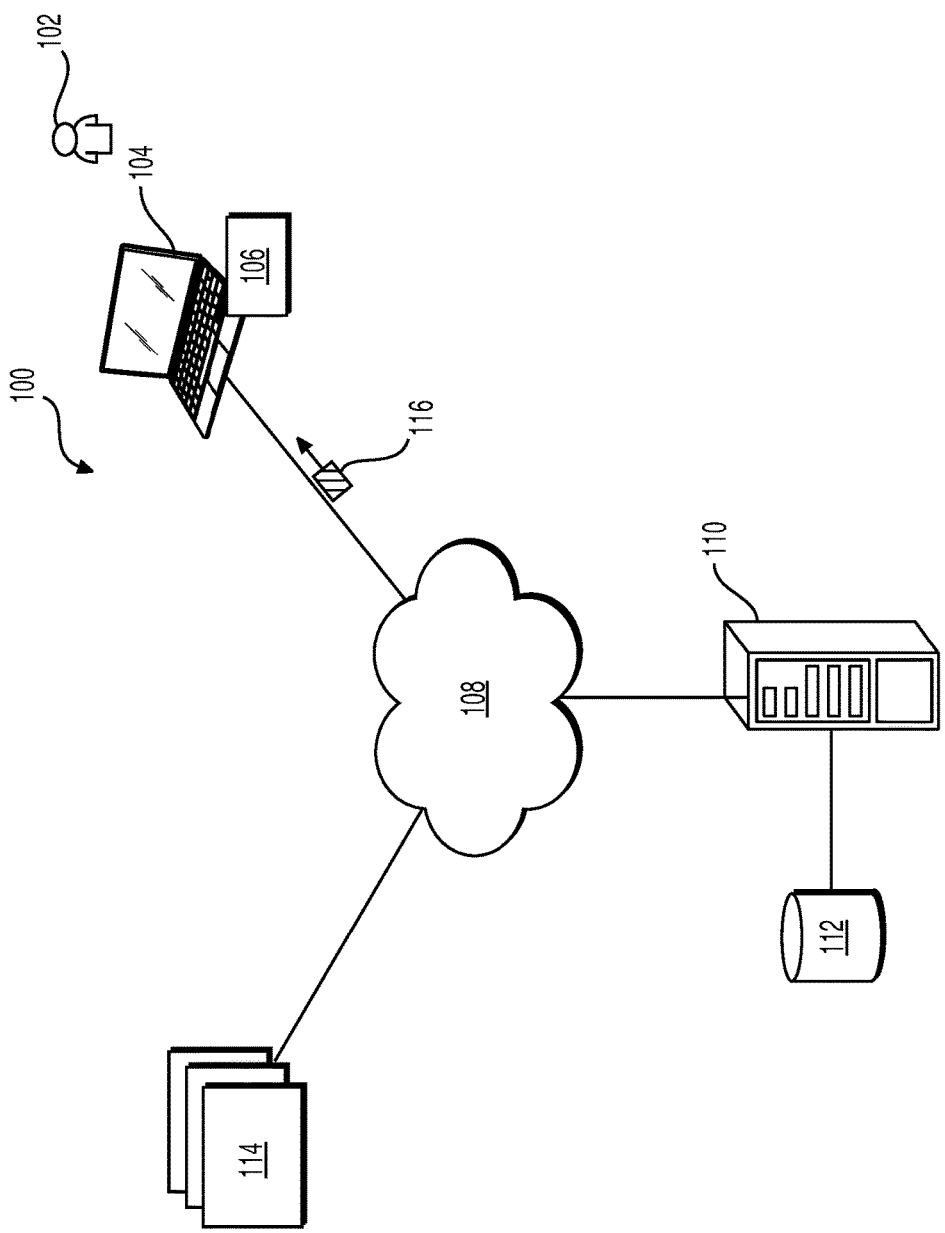
FIG. 1 is a schematic diagram of a networking system being an implementation of the present technology.

In FIG. 1 there is depicted a schematic diagram of a networking system 100 which is linked via a communication network 108. It is to be expressly understood that the networking system 100 is depicted as an illustrative implementation of the present technology. Thus, the following description should be considered only as the description of illustrative implementation of the present technology. This description is not intended to define the scope or set forth the bounds of the present technology. In some cases, what are believed to be helpful examples of modifications to the networking system 100 may also be described below. This is done merely as an aid to understanding, and, again, not to define the scope or set forth the bounds of the present technology. These modifications are not an exhaustive list, and, as a person skilled in the art would understand, other modification are likely possible. Further, where no examples of modifications have been set forth, it should not be interpreted that no modifications are possible and/or that what is described is the sole manner of implementing that, element of the present technology. As a person skilled in the art would understand, this is likely not the case. In addition it is to be understood that the networking system 100 may provide in certain instances simple implementations of the present technology, and that where such is the case they have been presented in this manner as an aid to understanding. As persons skilled in the art would understand, various implementations of the present technology may be of a greater complexity.

How a communication link is implemented is not particularly limited and will depend on which devices are connected to the communication network 108. As a non-limiting example, the connection of a server 110 to the communication network 108 can be implemented via a wired connection (such as an Ethernet based connection). At the same time, other devices could be also connected in other ways. In those examples, where the connected device is implemented as a wireless communication device (e.g. a smart-phone), the connection can be implemented as a wireless communication network (such as but not limited to, a 3G communications network link, a 4G communications network link, a Wireless Fidelity, or WiFi® for short, Bluetooth® and the like). In those examples, where an electronic device 104 is implemented as a desktop computer, the communication link can be either wireless or wired (such as an Ethernet based connection).

The networking system 100 may comprise the server 110. The server 110 may be implemented as a conventional computer server. In an example of an embodiment of the present technology, the server 110 may be implemented as a Dell™ PowerEdge™ Server running the Microsoft™ Windows Server™ operating system. Needless to say, the server 110 may be implemented in any other suitable hardware and/or software and/or firmware or a combination thereof. In the depicted non-limiting embodiment of present technology, the server 110 is a single server. In alternative non-limiting embodiments of the present technology, the functionality of the server 110 may be distributed and may be implemented via multiple servers. In some embodiments, the server 110 may comprise search engine software (not depicted) and may be further under control of a search engine provider such as Yandex™.

The server 110 includes an information storage medium 112 that might be used by the server 110. Generally, the information storage medium 112 may be implemented as a medium of any nature and kind whatsoever, including RAM, ROM, disks (CD-ROMs, DVDs, floppy disks, hard drivers, etc.), USB keys, solid state-drives, tape drives, etc. and also the combinations thereof.

The implementations of the server 110 are well known in the art. So, suffice it to state, that the server 110 comprises inter alia a network communication interface (such as a modem, a network card and the like) (not depicted) for two-way communication over the communication network 108; and a processor (not depicted) coupled to the network communication interface, the processor being configured to execute various routines, including those described herein below. To that end the processor may store or have access to computer readable instructions stored on the information storage medium 112, which instructions, when executed, cause the processor to execute the various routines described herein. The information storage medium 112 of the server 110 is configured to store data including computer-readable instructions and databases.

In some implementations, the information storage medium 112 is configured to store various data such as indexes of web pages that were crawled by a crawler application (not depicted) of the search engine software available on the server 110. In other embodiments, the information storage medium 112 may store other data received by the server 110.

The networking system 100 comprises the electronic device 104. The electronic device 104 is associated with a user 102, and thus can sometimes be referred to as "client devices" and/or "user electronic devices". It should be noted that the fact that the electronic device 104 is associated with the user 102 does not need to suggest or imply any mode of operation—such as a need to log in, a need to be registered or the like.

The electronic device 104 includes a storage (not depicted). Generally, the storage may be implemented as a medium of any nature and kind whatsoever, including RAM, ROM, disks (CD-ROMs, DVDs, floppy disks, hard drivers, etc.), USB keys, solid state-drives, tape drives, etc. and also the combinations thereof. The storage may store user files and program instructions. In particular, the storage may store the software for executing a browser 106. Generally speaking, the purpose of the browser 106 is to enable the user 102 to request web page data and display it thereto on a display (not depicted) of the electronic device 104.

The implementation of the electronic device 104 is not particularly limited, but as an example, the electronic device 104 may be implemented as a personal computer (desktops, laptops, netbooks, etc.), as a wireless communication device (a cell phone, a smartphone, a tablet and the like). In FIG. 1, the electronic device 104 is implemented as a laptop, such as for example, an Apple™ MacBook Pro™, the electronic device 104 may be executing the browser 106 being a Yandex™ browser. It should be expressly understood that any other commercially available or proprietary browser application can be used for implementing non-limiting embodiments of the present technology.

Moreover, it should be noted that the browser 106 and the search engine available at the server 110 may have a common or a distinct provider.

Furthermore, the networking system 100 comprises web servers 114 connected to the electronic device 104 and the server 110 via the communication network 108. In some implementations, the web servers 114 may store, process and provide the web page data in response to a web page request (not depicted) from the browser 106 or from the crawler application of the server 110 as it is known in the art. It should be noted that a plurality of web pages may be available at the web servers 114. Moreover, the web page data associated with a web page may be stored at a single web server amongst the web servers 114.

The web page data may comprise rendering instructions for enabling rendering of the web page by the browser 106 and additional data. The rendering instructions may be encompassed within at least one computer file as a portion of the web page data. The additional data may comprise transmission headers (e.g., TCP/IP), user login data, device data, other metadata, and the like.

In some embodiments of the present technology, the web page data may comprise a particular computer file written in a markup language, such as a Hypertext Markup Language (HTML), for example. In this example, the particular computer file may be an HTML document. It should be noted that the present technology is not limited to any specific markup language and that the teachings disclosed herein may be applied to computer files written in a different markup language such as XML, for example. The following embodiments will relate to the particular computer file being written in HTML for the sake of simplicity only and, as previously mentioned, the language in which the particular computer file is written is not a limiting aspect of the present technology.

In one embodiment, the HTML document may comprise the rendering instructions for rendering the web page by the browser 106, the web page being associated with the web page data. In other words, the rendering instructions comprise web page elements defined in or referenced from within the HTML document and information for the rendering thereof.

The rendering instructions within the HTML document may comprise structural or hierarchical information about the HTML elements. The rendering instructions may further comprise Cascading Style Sheets (CSS) instructions which include information about styles and layout of the web page elements for the rendering thereof. In some embodiments, the CSS instructions may be embedded in the HTML document or may be provided by a separate file which is referenced from within the HTML document. The separate file may be amongst the at least one computer file within the web page data.

The rendering instructions may further comprise various scripts (or codes) for rendering the web page elements. The various scripts, such as codes written in JavaScript or ActionScript programming languages, may enable the rendering of dynamic and/or interactive web page elements. In alternative embodiments, the various scripts may be embedded in the HTML document similarly to the CSS instructions, or may be provided by distinct files which are referenced from within the HTML document. The distinct files may be amongst the at least one computer file within the web page data.

In some embodiments, the browser 106 may send the web page request from the electronic device 104, via the communication network 108, upon the user 102 showing desire to view the web page. The user 102 may show desire to view the web page by furnishing the browser 106 with the Uniform Resource Locator (URL) associated with the web page, for example. In this case, the web page request may be received by the web servers 114. Responsive to the web page request, the web servers 114 may provide in return a data packet 116 to the electronic device 104 comprising the web page data, the web page data being associated with the web page that is further associated with the URL furnished by the user 102.

In other embodiments, the crawler application of the server 110 may "crawl" the web page stored at the web servers 114 and download the web page data associated with the web page to the server 110. The server 110 may then index and store the web page data in the information storage medium 112 for future use thereof by the search engine software, as a person skilled in the art will understand. The user 102 may have accessed the search engine provider's web site, such as www.yandex.com, via the browser 106 for viewing a set of search results corresponding to a user query. The search engine software may determine that the web page is amongst the set of search results corresponding to the user query and the browser 106 displays a Search Engine Results Page (SERP) comprising a search result associated with the web page. Upon the user 102 selecting the search result, the server 110 may retrieve the web page data associated with the web page from the information storage medium 112. In this case, the data packet 116 comprising the web page data may be sent by the server 110, via the communication network 108, to the electronic device 104. In some embodiments, the data packet 116 may comprise a plurality of data packets. Therefore, the web page data associated with the web page may be encompassed in the plurality of data packets.

In an embodiment, the electronic device 104 may receive the data packet 116 comprising the web page data. The electronic device 104 may use the additional data for identifying the data packet 116 and/or for further configuring the rendering instructions and the transmission thereof (based on the login data and/or the device data, for example) to the browser 106. The electronic device 104 may then transmit the rendering instructions to the browser 106 for rendering and eventually displaying the web page associated with the web page data to the user 102.

It should be understood that identifying a target object on the web page may have various benefits to the user 102 or the browser provider. In some embodiments, the target object may be an entity such as a logo, a map, a banner, an advertisement, an input form and the like. For example, if the user 102 is not desirous of viewing banners and advertisements, the browser 106 may be beneficial to the user 102 since the browser 106 may be further configured to hide from view the banners and the advertisements on the web page. In another example, the browser 106 being able to identify logos on the web page may be beneficial to the browser provider since the browser 106 may further be configured to collect data corresponding to the logos and furnishing it to the browser provider for various applications. For example, the collected data may be used by the browser provider for displaying pertinent favicons such as shortcut icons, web page icons, bookmark icons and the like to the user 102 while using the browser 106. Other benefits and advantages, from those mentioned above, of identifying the target object may become apparent to a person skilled in the art.

Therefore, in some embodiments, the browser 106 may collect the data associated with every target object candidate corresponding to the target object. The data may comprise the rendering instructions for every target object candidate corresponding to the target object. How the browser 106 determines which web page elements are target object candidates and which ones correspond to the target object will be further described below.

Three different scenarios that illustrate different embodiments of the present technology will now be described.

Scenario 1: Target Object is a Banner Entity

Let's say that in this case the target object is a banner entity. In an embodiment of the present technology, the user 102 may indicate her desire to view the web page having a rendered version 200 of the web page depicted in FIG. 2 on the display of the electronic device 104. The browser 106 may receive and parse the rendering instructions for rendering the rendered version 200 of the web page.

In some embodiments, potential types of the target object may correspond to types of the web page elements that may be associated with the banner entity. The types of the web page elements that may be associated with the banner entity may be an image, a video and a flash object, for example. Therefore, in one embodiment, by parsing the rendering instructions for rendering the rendered version 200 of the web page, the browser 106 may identify a target object candidate (not depicted) amongst the web page elements within the rendering instructions by determining which web page element of the web page to be rendered is associated with the type being one of the potential types of the target object. In other embodiments, the browser 106 may identify the target object candidate by monitoring which web page element of the web page is the first one to be loaded on the rendered version 200 of the web page. It should be noted, that other techniques for identifying the target object candidate may be implemented in further embodiments of the present technology. Moreover, the types of the web page elements have been presented for explanation purposes only and should not be considered as an exhaustive list of the potential types of the target object being the banner entity.

Then, the browser 106 may render the rendered version 200 of the web page based on the rendering instructions comprised in the data packet 116 (see FIG. 1). The rendered version 200 of the web page may comprise a rendered title 204, a rendered version 202 of the target object candidate and rendered text content 206. It should be noted that the rendered version 200 of the web page may comprise additional rendered web page elements and that rendered web page elements depicted in FIG. 2 were the only ones to be illustrated for the sake of simplicity.

Each rendered web page element of the rendered version 200 of the web page having been rendered by the browser 106 is associated with rendered object characteristics. In other words, the rendered object characteristics are characteristics of the rendered web page elements that the browser 106 is "aware of" after the rendering of the web page and without the need of looking them up in the rendering instructions. In some embodiments, the rendered object characteristics may comprise size, position, styles, hierarchy and drawing order of each rendered web page element by the browser 106. It should be noted that additional rendered object characteristics may be implemented in further embodiments of the present technology.

In additional embodiments, the browser 106 may then execute a verification process on the rendered version of the web page 200 to confirm that the target object candidate is the target object. To this end, the browser 106 may apply a set of predetermined rules to the rendered version 202 of the target object candidate.

In some embodiments, the set of predetermined rules has been predetermined based on the rendered object characteristics of the target object. Banners, in general, tend to have similar or comparable rendered object characteristics values. In other words, banners, in general, tend to have similar or comparable size values, position values, style values, hierarchy values and drawing order values on web pages comprising banners. For example, the set of predetermined rules may be predetermined by a human assessor that surveyed common web pages to discern the rendered object characteristics of the target object. In other words, the human assessor may predetermine the set of predetermined rules based on the observed rendered object characteristics of the banner entity.

Therefore, in some embodiments, the set of predetermined rules may comprise rules associated with a size of the target object, a position of the target object, styles of the target object, hierarchy of the target object and a drawing order of the target object. Consequently, the browser 106 may determine at least one rendered object characteristic value associated with the rendered version 202 of the target object candidate and may validate each rule within the set of predetermined rules with the at least one rendered object characteristic value.

The set of predetermined rules having been predetermined based on the rendered object characteristics of the target object may comprise the rules such as, for example: the width of no more than 500 pixels, the height of no more than 150 pixels, is located at the right of the web page, is centered with respect to the web page, is hidden due to the drawing order, is intersecting another rendered web page element, frame of no more than 5 pixels, shadowing of the frame less than 50%, and the like. In additional embodiments, the set of predetermined rules may comprise more than one rule per rendered object characteristic of the target object. It should be noted that the rules having been previously listed do not denote an exhaustive list of the rules and, therefore, should not be considered as sole rules contemplated by the present technology.

As it was alluded to above, applying the set of predetermined rules to the rendered version 202 of the target object candidate may comprise determining the at least one rendered object characteristic value associated with the rendered version 202 of the target object candidate. For example, the browser 106 may determine that the rendered version 202 of the target object candidate has the at least one rendered object characteristic value of 160 pixels in height by 450 pixels in width (i.e., for the rendered object characteristic of size).

The browser 106 may then validate each rule within the set of predetermined rules with the at least one rendered object characteristic value. In other embodiments, based on an outcome of the validating each rule within the set of predetermined rules with the at least one rendered object characteristic value, the browser 106 may assign a likelihood parameter indicative of a probability of the target object candidate being the target object. For example, the likelihood parameter may indicate the probability of the target object candidate being the target object in percentages. It should be noted that the likelihood parameter may indicate the probability of the target object candidate being the target object in other ratios than percentages in further implementations of the present technology.

In further embodiments, at least one rule within the set of predetermined rules may be a soft rule. This means that the at least one rule may be positively validated if the rendered object characteristic value of the target object candidate is within an interval of values defined in the at least one rule, contrariwise to a hard rule that may be positively validated only if the rendered object characteristic value of the target object candidate is equal to a unique value defined in the hard rule. For example, the soft rule may be: the width of no more than 400 pixels. In this example, the soft rule will be positively validated if the rendered object characteristic value of width of the target object candidate is within the interval of values from 0 pixels to 400 pixels. Needless to say, other soft rules and other intervals of values may be contemplated additional embodiments of the present technology.

In some embodiments, responsive to the likelihood parameter being above a predetermined threshold, the browser 106 may determine that the target object candidate corresponds to the target object. Needless to say, that the predetermined threshold may depend on how the likelihood parameter indicates the probability of the target object candidate being the target object. If the likelihood parameter is expressed in percentages, the predetermined threshold may be 80%, for example. Therefore, if the likelihood parameter having been assigned is at least 80%, the browser 106 may determine that the target object candidate corresponds to the target object. Other predetermined thresholds may be predetermined in further implementations of the present technology.

To this end, the browser 106 may comprise a machine learned algorithm that receives the outcome of the validating as an input and outputs the likelihood parameter. In some embodiments, the outcome of the validating may be a vector having a number of dimensions equal to a number of rules in the set of predetermined rules. In other embodiments, the machine learned algorithm may have been previously trained with respect to the target object. In this case, the machine learned algorithm may have been trained for outputting the likelihood parameter of the target object candidate being the banner entity. In other cases where the target object is an entity different from the banner entity, the machined learned algorithm may have been previously trained for outputting the likelihood parameter of the target object candidate being the entity different from the banner entity.

In yet additional embodiments, validating at least one additional rule within the set of predetermined rules may have a detrimental effect on the likelihood parameter. For example, the at least one additional rule may be: the height of no more than 10 pixels. In this case, if the at least one additional rule is validated the machine learned algorithm for the target object being the banner entity may diminish the likelihood parameter since the target object candidate having the height less than 10 pixels is less likely to correspond to the target object.

Scenario 2: Target Object is a Map Entity

Figure 3:
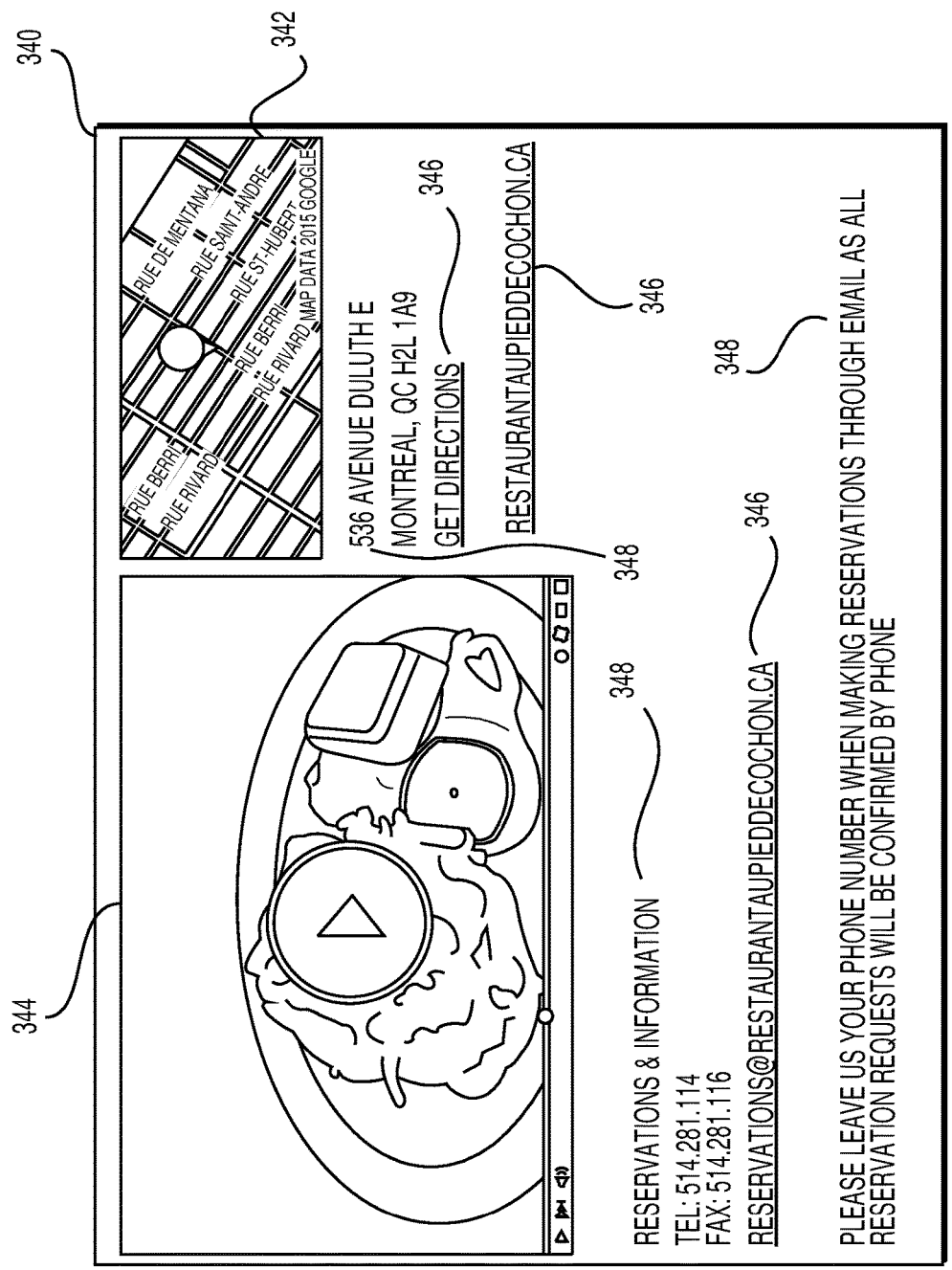
FIG. 3 illustrates an example of the rendered version of the web page by the browser.

Let's say that in this case the target object is the map entity. In an embodiment of the present technology, the user 102 may indicate her desire to view the web page having a rendered version 340 of the web page depicted in FIG. 3 on the display of the electronic device 104. The browser 106 may receive and parse the rendering instructions for rendering the rendered version 340 of the web page. It should be noted that the web page the user 102 desires to view in scenario 2 is different from the web page the user 102 desired to view in scenario 1.

In some embodiments, the potential types of the target object may correspond to the types of the web page elements that may be associated with the map entity. The types of the web page elements that may be associated with the map entity may be an image, a map object, a static link, a map API, for example. Therefore, by parsing the rendering instructions for rendering the rendered version 340 of the web page, the browser 106 may identify the target object candidate (not depicted) amongst the web page elements within the rendering instructions by determining which web page element of the web page to be rendered is associated with the type being one of the potential types of the target object. It should be noted, that other techniques for identifying the target object candidate may be implemented in further embodiments of the present technology. Moreover, the types of the web page elements have been presented for explanation purposes only and should not be considered as an exhaustive list of the potential types of the target object being the map entity.

Then, the browser 106 may render the rendered version 340 of the web page based on the rendering instructions comprised in the data packet 116 (see FIG. 1). The rendered version 340 of the web page may comprise a rendered video 344, a rendered version 342 of the target object candidate, rendered hyperlinks 346 and rendered text contents 348. It should be noted that the rendered version 340 of the web page may comprise additional rendered web page elements and that the rendered web page elements depicted in FIG. 3 were the only ones to be illustrated for the sake of simplicity.

Each web page element of the rendered version 340 of the web page is associated with code features. The code features of the web page element relate to data, tags, attributes, scripts and/or details incorporated in the rendering instructions of the web page element. In some embodiments, the code features of the web page element may relate to any information that can be inferred or extracted from the code strings of the rendering instructions. This means that the code features of the web page element may relate to any code string of the web page element indicated in the rendering instructions. Therefore, the code features may be related to the type of the web page element since each type may have particular tags, particular attributes and particular code strings. Additional examples of the code features and their implementation in some embodiments of the present technology will be further described below.

In another embodiment, the browser 106 may then execute the verification process on the rendered version 340 of the web page to confirm that the target object candidate is the target object. To this end, in this case, the browser 106 may apply the set of predetermined rules comprising the rules having been predetermined based on the rendered object characteristics of the target object and at least one other predetermined rule, the at least one other predetermined rule having been predetermined based on the code features related to the potential types of the target object. In other words, the set of predetermined rules comprises the rules having been predetermined based on the rendered object characteristics of the map entity and on the at least one other predetermined rule having been predetermined based on the code features related to the potential types of the map entity.

In another embodiment, the at least one other predetermined rule may have been predetermined by the human assessor. In other words, the human assessor may assess the code features related to the potential types of the target object and predetermine the at least one other predetermined rule based on the assessment. For example, in this case, the human assessor may survey various web pages comprising maps to discern the types of the web page elements corresponding to the maps. Then, the human assessor may assess the code features related to each type of the web page elements corresponding to the maps of the various web pages. In other words, the human assessor may determine that, for example, four types of web page elements may correspond to the target object being the map entity and then may assess the code features related to each type amongst the four types of web page elements.

In some embodiments, the set of predetermined rules may be unique with respect to each target object. This means that the set of predetermined rules may comprise unique rules having been predetermined with respect to the entity of the target object. In alternative embodiments, at least some rules within the set of predetermined rules may be identical for different target object entities. This means that the set of predetermined rules for the target object being a first entity may comprise the at least some rules being identical to the at least some rules within the set of predetermined rules for the target object being a second entity. In yet further embodiments, the set of predetermined rules may be identical for the target object being the first entity and for the target object being the second entity.

In this case, the at least one other predetermined rule having been predetermined based on the code features related to the potential types of the target object being the map entity may be: contains latitude tag <lat>, contains longitude tag <lng>, external script file attribute (i.e., src attribute) contains the character string "map", character string "geocode" exists, address attribute exists, etc. It goes without saying that examples of the at least one other predetermined rule having been listed do not denote an exhaustive list of the at least one other predetermined rule. Moreover, the at least one other predetermined rule having been exemplified was predetermined based on the code features related to the potential types of the map entity. In other cases where the target object is an entity different from the map entity, the at least one other predetermined rule may be predetermined based on the code features related to the potential types of the target object being the entity different from the map entity.

In some embodiments, the browser 106 may determine a code feature value of the target object candidate from the rendering instructions thereof. The code feature value may be related to a specific tag, an attribute value and/or to a specific code string that can be inferred or extracted from the code strings of the rendering instructions of the target object candidate. In this case, the code feature value may be the specific code string, such as <script src="http://api-maps.yandex.ru/2.1/?lang=Eng" type="text/javascript"></script> for example, that was extracted from the code strings of the rendering instructions of the target object candidate. In another example, the code feature value may be the specific tag, such as <map> or <area> for example, indicated in the rendering instructions of the target object candidate.

Consequently, the browser 106 may further validate each rule within the set of predetermined rules. In some embodiments, more specifically, the rules having been predetermined based on the rendered object characteristics of the target object and the at least one other predetermined rule having been predetermined based on the code features related to the potential types of the target object may be validated with the at least one rendered object characteristic value associated with the rendered version 342 of the target object candidate and the code feature value of the target object candidate, respectively.

In other embodiments, based on the outcome of the validating each rule within the set of predetermined rules comprising the at least one other predetermined rule, the browser 106 may assign the likelihood parameter indicative of the probability of the target object candidate being the target object.

To this end, in some embodiments, the browser 106 may comprise a machine learned algorithm that receives the outcome of the validating as an input and outputs the likelihood parameter. In this case, the outcome of the validating may be the vector having the number of dimensions equal to the number of rules in the set of predetermined rules comprising the at least one other predetermined rule.

Scenario 3: Target Object is a Logo Entity

Let's say that in this case the target object is the logo entity. In an embodiment of the present technology, the user 102 may indicate her desire to view the web page having a rendered version 480 of the web page depicted in FIG. 4 on the display of the electronic device 104. The browser 106 may receive and parse the rendering instructions for rendering the rendered version 480 of the web page. It should be noted that the web page the user 102 desires to view in scenario 3 is different from the web page the user 102 desired to view in the scenarios 1 and 2.

In some embodiments, the potential types of the target object may correspond to the types of the web page elements that may be associated with the logo entity. The types of the web page elements that may be associated with the logo entity may be an image, a link, an object, for example. Therefore, in alternative embodiments, by parsing the rendering instructions for rendering the rendered version 480 of the web page, the browser 106 may identify a plurality of target object candidates (not depicted) amongst the web page elements within the rendering instructions by determining which web page elements of the web page to be rendered are associated with the types being the potential types of the target object. It should be noted, that other techniques for identifying the plurality of target object candidates may be implemented in further embodiments of the present technology. Moreover, the types of the web page elements have been presented for explanation purposes only and should not be considered as an exhaustive list of the potential types of the target object being the logo entity.

In this case, the plurality of target object candidates may comprise a first target object candidate (not depicted) and a second target object candidate (not depicted). The first target object candidate being of a first type and the second target object candidate being of a second type. Needless to say, the potential types of the target object include the first type and the second type.

Then, the browser 106 may render the rendered version 480 of the web page based on the rendering instructions comprised in the data packet 116 (see FIG. 1). The rendered version 480 of the web page may comprise a rendered version 482 of the first target object candidate (i.e., associated with the first target object being of the first type, the first type being the image type, for example), a rendered input field 484, a rendered title 486, a rendered version 490 of the second target object candidate (i.e., associated with the second target object candidate being of the second type, the second type being the link type, for example) and a rendered video 492. It should be noted that the rendered version 480 of the web page may comprise additional rendered web page elements and that the rendered web page elements depicted in FIG. 4 were the only ones to be illustrated for the sake of simplicity.

The browser 106 may then execute the verification process to confirm that the first target object candidate is the target object and that the second target object candidate is the target object. In other words, in this case, the browser 106 may then execute the verification process for each target object candidate to confirm that each target object candidate is the target object (in this example, the target object being the logo entity).

To this end, in some embodiments, the browser 106 may apply the set of predetermined rules comprising sub-sets of predetermined rules, the sub-sets of predetermined rules having been predetermined based on the rendered object characteristics of the target object and the code features being related, respectively, to each potential type of the target object. For example, in this case, the set of predetermined rules may comprise three sub-sets of predetermined rules, the three sub-sets of predetermined rules having been predetermined based on the rendered object characteristics of the logo entity and the code features being related, respectively, to each potential type of the logo entity (e.g., the image type of logo, the link type of logo, the object type of logo, for example). This means that the set of predetermined rules may comprise a number of sub-sets of predetermined rules at least equal to a number of potential types of the target object.

The browser 106 may apply a first sub-set of predetermined rules which comprises the rules having been predetermined based on the rendered object characteristics of the target object and the at least one other predetermined rule having been predetermined based on the code features being related to the first type. More specifically, the rules having been predetermined based on the rendered object characteristics of the target object within the first sub-set of predetermined rules may be applied to the rendered version 482 of the first target object candidate and the at least one other predetermined rule having been predetermined based on the code features being related to the first type within the first sub-set of predetermined rules may be applied to the first target object candidate.

In this case, the first type of the first target object candidate may be the image type. This means that the browser 106 may apply the rules having been predetermined based on the rendered object characteristics of the logo entity (i.e., that are within the first sub-set of predetermined rules) to the rendered version 482 of the first target object candidate and the at least one other predetermined rule having been predetermined based on the code features being related to the image type (i.e., that is within the first sub-set of predetermined rules) to the first target object candidate.

Similarly, the browser 106 may apply a second sub-set of predetermined rules which comprises the rules having been predetermined based on the rendered object characteristics of the target object and the at least one other predetermined rule having been predetermined based on the code features being related to the second type. More specifically, the rules having been predetermined based on the rendered object characteristics of the target object within the second sub-set of predetermined rules may be applied to the rendered version 490 of the second target object candidate and the at least one other predetermined rule having been predetermined based on the code features being related to the second type within the second sub-set of predetermined rules may be applied to the second target object candidate.

In this case, the second type of the second target object candidate is the link type. This means that the browser 106 may apply the rules having been predetermined based on the rendered object characteristics of the logo entity (i.e., that are also within the second sub-set of predetermined rules) to the rendered version 482 of the second target object candidate and the at least one other predetermined rule having been predetermined based on the code features being related to the link type (i.e., that is within the second sub-set of predetermined rules) to the second target object candidate.

It yet other embodiments, if the first target object candidate and the second target object candidate are both related to the first type, the first sub-set of predetermined rules may be applied on the first target object candidate and the second target object candidate during the execution of the verification process. Similarly, if the first target object candidate and the second target object candidate are both related to the second type, the second sub-set of predetermined rules may be applied on the first target object candidate and the second target object candidate during the execution of the verification process.

In some embodiments, the browser 106 may further validate each rule within the first sub-set of predetermined rules. In other words, the browser 106 may validate each rule within the first sub-set of predetermined rules having been predetermined based on the rendered object characteristics of the target object with the at least one rendered object characteristic value associated with the rendered version 482 of the first target object candidate and the at least one other predetermined rule within the first sub-set of predetermined rules with the code feature value of the first target object candidate.

Similarly, in alternative embodiments, the browser 106 may further validate each rule within the second sub-set of predetermined rules. In other words, the browser 106 may validate each rule within the second sub-set of predetermined rules having been predetermined based on the rendered object characteristics of the target object with the at least one rendered object characteristic value associated with the rendered version 490 of the second target object candidate and the at least one other predetermined rule within the second sub-set of predetermined rules with the code feature value of the second target object candidate.

In other embodiments, based on the outcome of the validating each rule within the first and the second sub-sets of predetermined rules, the browser 106 may assign the likelihood parameters indicative of the probability of the first target object candidate being the target object and of the second target object candidate being the target object.

In further embodiments, responsive to the likelihood parameters of the first and the second target object candidates being above the predetermined threshold, the browser 106 may determine that the first and the second target object candidates correspond to the target object. In this case, if the predetermined threshold is 80% and the likelihood parameters of the first and the second target object candidates are at least 80%, for example, then the browser 106 may determine that the first target object candidate corresponds to the target object being the logo entity and that the second target object candidate also corresponds to the target object being the logo entity. Therefore, in some implementation of the present technology, the browser 106 may determine more that more than one target object candidates correspond to the target object.

Figure 5:
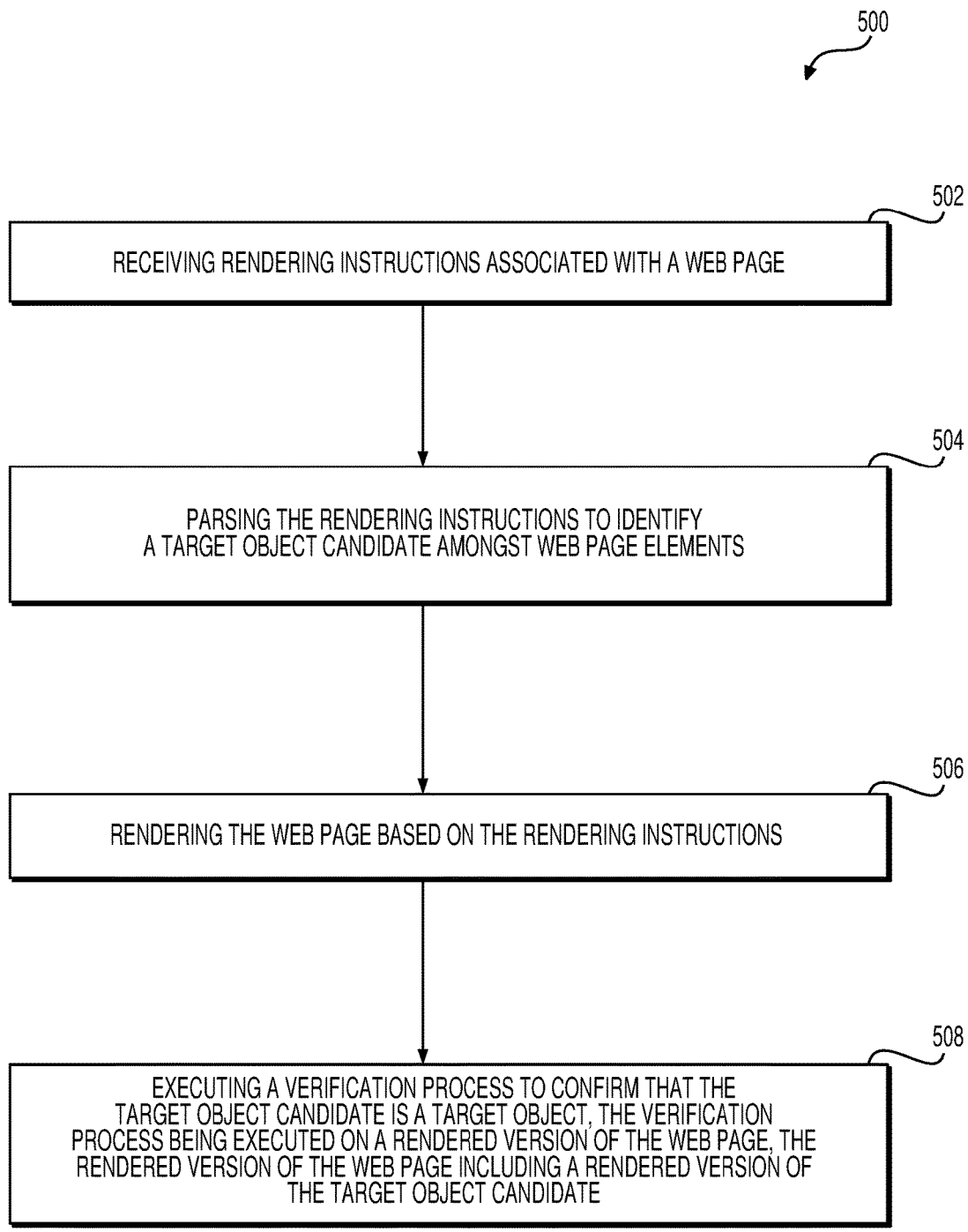
FIG. 5 illustrates a method of identifying a target object on a web page being an implementation of the present technology.

In some embodiments of the present technology, the browser 106 may execute steps 502, 504, 506 and 508 of method 500 depicted in FIG. 5. The method 500 will now be described.

Step 502: Receiving the Rendering Instructions

The method 500 begins with the step 502 with the browser 106 (see FIG. 1) receiving the rendering instructions associated with the web page. As it was alluded to above, the rendering instructions may be encompassed within the at least one computer file as the portion of the web page data, the web page data comprised in the data packet 116 received by the electronic device 104. The rendering instructions comprise web page elements defined in or referenced from within the at least one computer file and information for the rendering thereof.

Step 504: Parsing the Rendering Instructions

The method 500 continues to the step 504 with the browser 106 parsing the rendering instructions to identify the target object candidate amongst the web page elements.

In some embodiments, by parsing the rendering instructions, the browser 106 may identify the target object candidate by monitoring which web page element of the web page may be the first one to be loaded on the rendered version of the web page.

In other embodiments, by parsing the rendering instructions, the browser 106 may identify the type of each web page element, the web page elements comprising the target object candidate. Then, the browser 106 may identify the target object candidate amongst the web page elements within the rendering instructions by determining which web page element of the web page to be rendered is associated with the type being one of the potential types of the target object.

In alternative embodiments, by parsing the rendering instructions, the browser 106 may identify the plurality of target object candidates amongst the web page elements within the rendering instructions. The browser 106 may identify the plurality of target object candidates by determining which web page elements of the web page to be rendered are associated with the type being one of the potential types of the target object. In yet further embodiments, the plurality of target object candidates may comprise the first target object candidate being of the first type and the second target object candidate being of the second type.

Step 506: Rendering the Web Page

The method 500 continues to the step 506 with the browser 106 (see FIG. 1) rendering the web page based on the rendering instructions. As it was alluded to above, each rendered web page element of the web page having been rendered by the browser 106 is associated with the rendered object characteristics. Needless to say, the rendered versions 200, 340 and 480 of the web page (depicted in FIGS. 2, 3 and 4 respectively) correspond to three different web pages desired to be viewed by the user 102.

Step 508: Executing a Verification Process

The method 500 continues to the step 508 with the browser 106 (see FIG. 1) executing the verification process to confirm that the target object candidate is the target object. The verification process may be executed on the rendered version 200 of the web page, the rendered version 200 of the web page including the rendered version 202 of the target object candidate. In some embodiments, the verification process may be executed on the rendered version 340 of the web page and on the rendering instructions for rendering the web page associated with the rendered version 340 of the web page.

Figure 2:
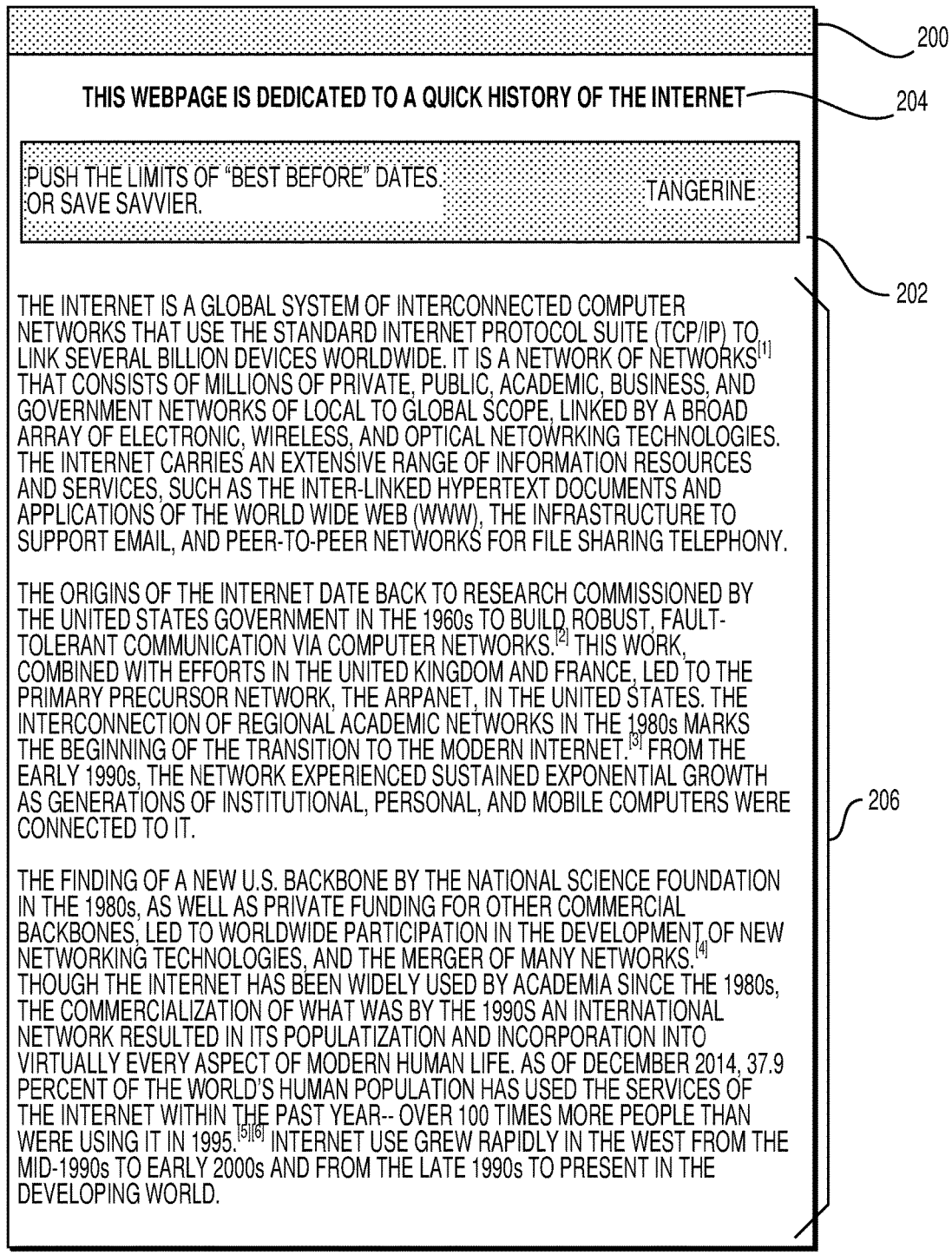
FIG. 2 illustrates an example of the rendered version of the web page by the browser.

The verification process may comprise applying the set of predetermined rules to the rendered version 202 of the target object candidate depicted in FIG. 2. The set of predetermined rules may have been predetermined based on rendered object characteristics of the target object.

In some embodiments, the set of predetermined rules may further comprise the at least one other predetermined rule having been predetermined based on the code features related to the potential types of the target object. The at least one other predetermined rule may be applied to the target object candidate (i.e., the target object candidate associated with the rendered version 342 of the target object candidate depicted in FIG. 3).

In other embodiments, the set of predetermined rules may further comprise sub-sets of predetermined rules. Each subset of predetermined rules may have been predetermined based on the rendered object characteristics of the target object and based on the code features that are related, respectively, to each potential type of the target object.

The applying may comprise determining the at least one rendered object characteristic value associated with the rendered version 202 of the target object candidate and validating each rule within the set of predetermined rules with the at least one rendered object characteristic value.

In some embodiments, the applying may further comprise validating the at least one other predetermined rule with the code feature value of the target object candidate (i.e., the target object candidate associated with the rendered version 342 of the target object candidate). The code feature value may be determined from the rendering instructions.

Figure 4:
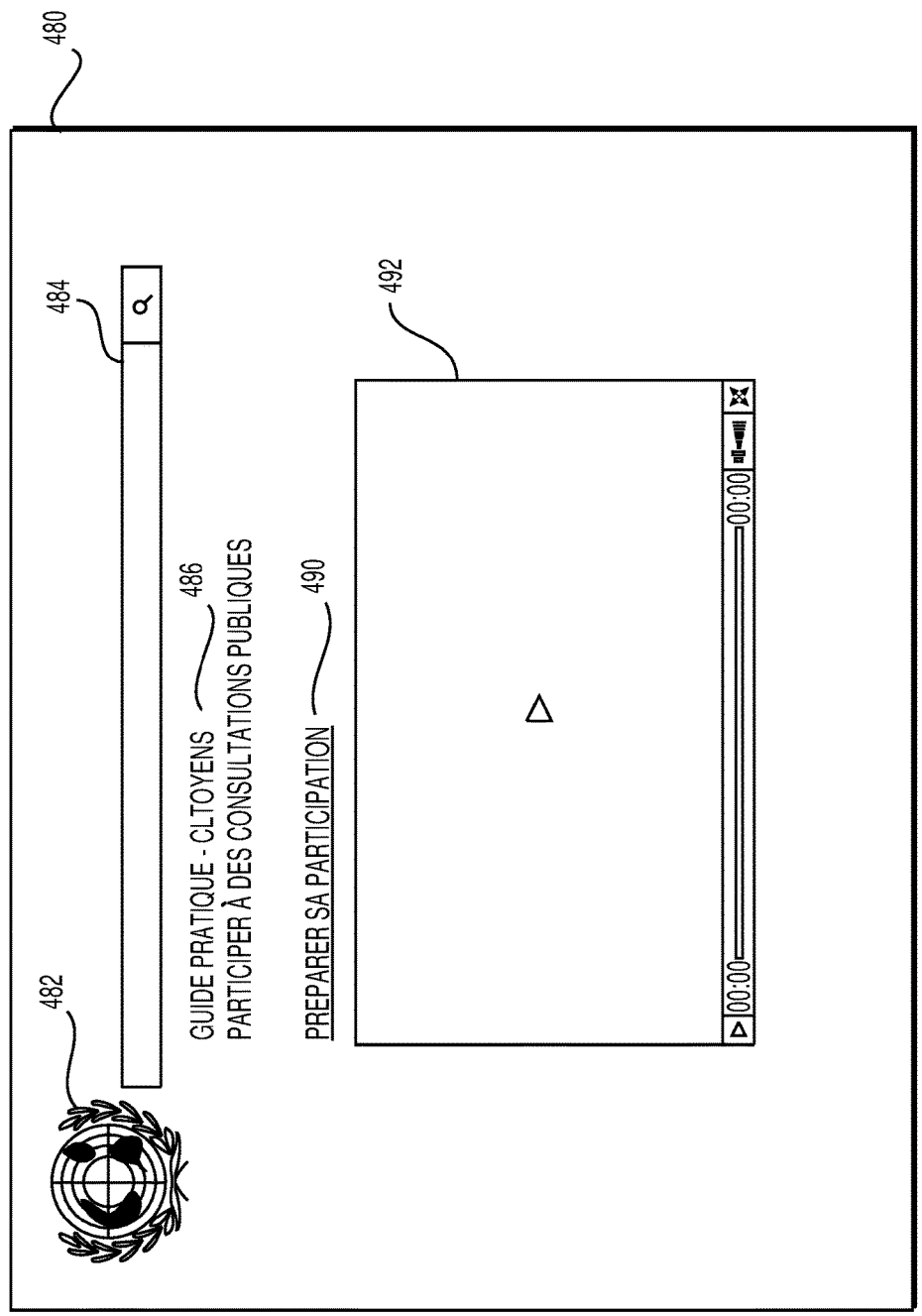
FIG. 4 illustrates an example of the rendered version of the web page by the browser.

In other embodiments, the applying may further comprise validating each rule within the first and the second sub-sets of predetermined rules if the plurality of the target object candidates comprises the first target object candidate (i.e., the first target object candidate associated with the rendered version 482 of the first target object candidate depicted in FIG. 4) and the second target object candidate (i.e., the second target object candidate associated with the rendered version 490 of the second target object candidate depicted in FIG. 4).

The verification process may also comprise assigning the likelihood parameter indicative of the probability of the target object candidate being the target object. The likelihood parameter may be based on the outcome of the validating each rule within the set of predetermined rules with the at least one rendered object characteristic value.

In some embodiments, the likelihood parameter further may be based on the outcome of the validating the at least one other predetermined rule with the code feature value.

In other embodiments, the verification process may also comprise assigning the likelihood parameter to the first and to the second target object candidates, respectively, if the plurality of target object candidates comprises the first and the second target object candidates. The likelihood parameters of the first target object candidate and of the second target object candidate may have been assigned based on the outcome of the validating each rule within the first and the second sub-sets of predetermined rules, respectively.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

As such, from one perspective, embodiments of the present technology described above can be described as follows, structured in numbered clauses.

CLAUSE 1. A method of identifying a target object on a web page, the web page being associated with rendering instructions for rendering web page elements of the web page, the method executed by a browser (106) at an electronic device (104), the method comprising:
  receiving (502) the rendering instructions associated with the web page;
  parsing (504) the rendering instructions to identify a target object candidate amongst the web page elements;
  rendering (506) the web page based on the rendering instructions;
  executing (508) a verification process to confirm that the target object candidate is the target object, the verification process being executed on a rendered version (200) of the web page, the rendered version (200) of the web page including a rendered version (202) of the target object candidate, the verification process comprising:
    applying a set of predetermined rules to the rendered version (202) of the target object candidate, the set of predetermined rules having been predetermined based on rendered object characteristics of the target object, the applying comprises:
      determining at least one rendered object characteristic value associated with the rendered version (202) of the target object candidate;
      validating each rule within the set of predetermined rules with the at least one rendered object characteristic value; and
    assigning a likelihood parameter indicative of a probability of the target object candidate being the target object, the likelihood parameter being based on an outcome of the validating each rule within the set of predetermined rules with the at least one rendered object characteristic value.

CLAUSE 2. The method of clause 1, wherein the rendering instructions are a portion of a web page data.

CLAUSE 3. The method of clause 1, wherein parsing (504) the rendering instructions comprises identifying a type of the target object candidate, the type being one of potential types of the target object;
  the verification process being further executed on the rendering instructions, the verification process further comprises:
    applying at least one other predetermined rule within the set of predetermined rules to the target object candidate, the at least one other predetermined rule having been predetermined based on code features related to the potential types of the target object, the code features related to the potential types of the target object having been assessed by a human assessor, the applying comprises:
      validating the at least one other predetermined rule with a code feature value of the target object candidate, the code feature value being determined from the rendering instructions; and
    assigning the likelihood parameter indicative of a probability of the target object candidate being the target object, the likelihood parameter being further based on the outcome of the validating the at least one other predetermined rule with the code feature value.

CLAUSE 4. The method of clause 3, further comprising, responsive to the likelihood parameter being above a predetermined threshold, determining that the target object candidate corresponds to the target object.

CLAUSE 5. The method of clause 1, wherein the target object is at least one of a logo entity, a map entity, a banner entity, an advertisement entity and an input form entity.

CLAUSE 6. The method of clause 3, wherein the target object candidate is one of a plurality of target object candidates identified during execution of the parsing.

CLAUSE 7. The method of clause 6, wherein a first target object candidate of the plurality of target object candidates is of a first type and a second target object candidate of the plurality of target object candidates is of a second type.

CLAUSE 8. The method of clause 7, wherein the set of predetermined rules comprises sub-sets of predetermined rules, each sub-set of predetermined rules having been predetermined based on the rendered object characteristics of the target object and based on the code features that are related, respectively, to each potential type, the potential types including the first type and the second type.

CLAUSE 9. The method of clause 8, wherein likelihood parameters of the first target object candidate and of the second target object candidate have been assigned based on the outcome of the validating each rule within a first and a second sub-sets of predetermined rules respectively, the first sub-set of predetermined rules having been predetermined based on the rendered object characteristics of the target object and the code features being related to the first type and the second sub-set of predetermined rules having been predetermined based on the rendered object characteristics of the target object and the code features being related to the second type.

CLAUSE 10. The method of clause 1, wherein executing (508) the verification process is performed by means of a machine learned algorithm.

CLAUSE 11. The method of clause 1, wherein at least one rule within the set of predetermined rules is a soft rule.

CLAUSE 12. The method of clause 1, wherein validating at least one additional rule within the set of predetermined rules has a detrimental effect on the likelihood probability.

CLAUSE 13. The method of clause 9, wherein responsive to the likelihood parameters of more than one target object candidates being above the predetermined threshold, determining that the more than one target object candidates correspond to the target object.

CLAUSE 14. The method of clause 13, wherein the method further comprises collecting data associated with every target object candidate corresponding to the target object, the data comprising the rendering instructions for every target object candidate corresponding to the target object.

CLAUSE 15. A computing apparatus having a processor, the processor executing a browser (106), the browser (106) being executed for identifying a target object on a web page, the web page being associated with rendering instructions for rendering web page elements of the web page, and the browser (106) being configured to execute the method steps of clauses 1 to 14.

What we claim is:

1. A method of identifying a target object on a web page, the web page being associated with rendering instructions for rendering web page elements of the web page, the method executed by an electronic device, the method comprising:
   receiving the rendering instructions associated with the web page;
   parsing the rendering instructions to identify a target object candidate amongst the web page elements;
   rendering, on a screen of the electronic device, the web page based on the rendering instructions;
   executing a verification process to confirm that the target object candidate is the target object, the verification process being executed on a rendered version of the web page, the rendered version of the web page including a rendered version of the target object candidate, the verification process comprising:
      applying a set of predetermined rules to the rendered version of the target object candidate, the set of predetermined rules having been predetermined based on rendered object characteristics of the target object, the applying comprises:
         determining at least one rendered object characteristic value associated with the rendered version of the target object candidate;
         validating each rule within the set of predetermined rules with the at least one rendered object characteristic value; and
         assigning a likelihood parameter indicative of a probability of the target object candidate being the target object, the likelihood parameter being based on an outcome of the validating each rule within the set of predetermined rules with the at least one rendered object characteristic value,
   wherein the parsing the rendering instructions comprises identifying a type of the target object candidate, the type being one of potential types of the target object, the verification process being further executed on the rendering instructions, the verification process further comprising:
      applying at least one other predetermined rule within the set of predetermined rules to the target object candidate, the at least one other predetermined rule having been predetermined based on code features related to the potential types of the target object, the code features related to the potential types of the target object having been assessed by a human assessor, the applying comprises:
         validating the at least one other predetermined rule with a code feature value of the target object candidate, the code feature value being determined from the rendering instructions; and
      the likelihood parameter being further based on an outcome of the validating the at least one other predetermined rule with the code feature value,
   wherein the target object candidate is one of a plurality of target object candidates identified during execution of the parsing,
   wherein a first target object candidate of the plurality of target object candidates is of a first type and a second target object candidate of the plurality of target object candidates is of a second type,
   wherein the set of predetermined rules comprises sub-sets of predetermined rules, each sub-set of predetermined rules having been predetermined based on the rendered object characteristics of the target object and based on the code features that are related, respectively, to each potential type, the potential types including the first type and the second type, and
   wherein the likelihood parameters of the first target object candidate and of the second target object candidate have been assigned based on the outcome of the validating each rule within a first and a second sub-set of predetermined rules respectively, the first sub-set of predetermined rules having been predetermined based on the rendered object characteristics of the target object and the code features being related to the first type and the second sub-set of predetermined rules having been predetermined based on the rendered object characteristics of the target object and the code features being related to the second type.

2. The method of claim 1, wherein the rendering instructions are a portion of a web page data.

3. The method of claim 1, further comprising, responsive to a given one of the likelihood parameters being above a predetermined threshold, determining that the respective target object candidate corresponds to the target object.

4. The method of claim 1, wherein the target object is at least one of a logo entity, a map entity, a banner entity, an advertisement entity and an input form entity.

5. The method of claim 1, wherein executing the verification process is performed by means of a machine learned algorithm.

6. The method of claim 1, wherein at least one rule within the set of predetermined rules is a soft rule.

7. The method of claim 1, wherein validating at least one additional rule within the set of predetermined rules diminishes the respective probability.

8. The method of claim 1, wherein responsive to the likelihood parameters of the first and the second target object candidates being above the predetermined threshold, determining that the first and the second target object candidates correspond to the target object.

9. The method of claim 8, wherein the method further comprises collecting data associated with every target object candidate corresponding to the target object, the data comprising the rendering instructions for every target object candidate corresponding to the target object.

10. A computing apparatus having a processor, the processor executing a browser, the browser being executed for identifying a target object on a web page, the web page being associated with rendering instructions for rendering web page elements of the web page, the browser being configured to:
   receive the rendering instructions associated with the web page;
   parse the rendering instructions to identify a target object candidate amongst the web page elements;

render the web page based on the rendering instructions;
execute a verification process to confirm that the target object candidate is the target object, the verification process being executed on a rendered version of the web page, the rendered version of the web page including a rendered version of the target object candidate, the verification process comprising:
applying a set of predetermined rules to the rendered version of the target object candidate, the set of predetermined rules having been predetermined based on rendered object characteristics of the target object, the applying comprises:
determining at least one rendered object characteristic value associated with the rendered version of the target object candidate;
validating each rule within the set of predetermined rules with the at least one rendered object characteristic value; and
assigning a likelihood parameter indicative of a probability of the target object candidate being the target object, the likelihood parameter being based on an outcome of the validating each rule within the set of predetermined rules with the at least one rendered object characteristic value,
wherein to parse the rendering instructions comprises identifying a type of the target object candidate, the type being one of potential types of the target object, the verification process being further executed on the rendering instructions, the verification process further comprises:
applying at least one other predetermined rule within the set of predetermined rules to the target object candidate, the at least one other predetermined rule having been predetermined based on code features related to the potential types of the target object, the code features related to the potential types of the target object having been assessed by a human assessor, the applying comprises:
validating the at least one other predetermined rule with a code feature value of the target object candidate, the code feature value being determined from the rendering instructions; and
assigning the likelihood parameter indicative of a probability of the target object candidate being the target object, the likelihood parameter being further based on the outcome of the validating the at least one other predetermined rule with the code feature value,
wherein the target object candidate is one of a plurality of target object candidates identified during execution of the parsing,
wherein a first target object candidate of the plurality of target object candidates is of a first type and a second target object candidate of the plurality of target object candidates is of a second type,
wherein the set of predetermined rules comprises sub-sets of predetermined rules, each sub-set of predetermined rules having been predetermined based on the rendered object characteristics of the target object and based on the code features that are related, respectively, to each potential type, the potential types including the first type and the second type, and
wherein the likelihood parameters of the first target object candidate and of the second target object candidate have been assigned based on the outcome of the validating each rule within a first and a second sub-sets of predetermined rules respectively, the first sub-set of predetermined rules having been predetermined based on the rendered object characteristics of the target object and the code features being related to the first type and the second sub-set of predetermined rules having been predetermined based on the rendered object characteristics of the target object and the code features being related to the second type.

11. The computing apparatus of claim 10, wherein the rendering instructions are a portion of a web page data.

12. The computing apparatus of claim 10, further configured to, responsive to a given one of the likelihood parameters being above a predetermined threshold, determine that the respective target object candidate corresponds to the target object.

13. The computing apparatus of claim 10, wherein the target object is at least one of a logo entity, a map entity, a banner entity, an advertisement entity and an input form entity.

* * * * *